United States Patent
Okada et al.

(10) Patent No.: US 9,990,556 B2
(45) Date of Patent: Jun. 5, 2018

(54) IMAGE PROCESSING APPARATUS, IMAGING APPARATUS, MOVABLE OBJECT, PROGRAM, AND REGION SETTING METHOD

(71) Applicant: KYOCERA CORPORATION, Kyoto (JP)

(72) Inventors: Takahiro Okada, Okazaki (JP); Takatoshi Nakata, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days. days.

(21) Appl. No.: 14/414,784

(22) PCT Filed: Jul. 26, 2013

(86) PCT No.: PCT/JP2013/004559
§ 371 (c)(1),
(2) Date: Jan. 14, 2015

(87) PCT Pub. No.: WO2014/017104
PCT Pub. Date: Jan. 30, 2014

(65) Prior Publication Data
US 2015/0178582 A1    Jun. 25, 2015

(30) Foreign Application Priority Data
Jul. 27, 2012  (JP) .................. 2012-167778

(51) Int. Cl.
*G06K 9/00*     (2006.01)
*G06K 9/20*     (2006.01)
(Continued)

(52) U.S. Cl.
CPC ....... *G06K 9/2054* (2013.01); *G06K 9/00791* (2013.01); *G06K 9/3233* (2013.01);
(Continued)

(58) Field of Classification Search
CPC ............. G06K 9/00791; G06K 9/2054; G06K 9/3233; G06T 2207/30252; G06T 7/20;
(Continued)

(56) References Cited

U.S. PATENT DOCUMENTS 8,055,428 B2 * 11/2011 Okawa ................ G01C 21/00
340/435
8,134,480 B2   3/2012 Onome et al.
(Continued)

FOREIGN PATENT DOCUMENTS

CN   101395645 A   3/2009
JP   2006-178652 A  7/2006
(Continued)

OTHER PUBLICATIONS

International Search Report; PCT/JP2013/004559; dated Oct. 29, 2013.
(Continued)

*Primary Examiner* — Tom Y Lu
(74) *Attorney, Agent, or Firm* — Studebaker & Brackett PC

(57) ABSTRACT

An image processing apparatus (14) includes a road information receiver (24) and a region setter (25). The road information receiver (24) obtains road information around a movable object. The region setter (25), based on the road information, sets a region of a peripheral image of the movable object to extract.

15 Claims, 9 Drawing Sheets

(51) Int. Cl.
*G06T 7/20* (2017.01)
*G08G 1/0962* (2006.01)
*G08G 1/16* (2006.01)
*G06K 9/32* (2006.01)
*G08G 1/0967* (2006.01)
*H04N 7/18* (2006.01)

(52) U.S. Cl.
CPC ........... *G06T 7/20* (2013.01); *G08G 1/09623* (2013.01); *G08G 1/165* (2013.01); *G08G 1/166* (2013.01); *G08G 1/168* (2013.01); *G06T 2207/30252* (2013.01); *G08G 1/09626* (2013.01); *G08G 1/096716* (2013.01); *G08G 1/096783* (2013.01); *H04N 7/18* (2013.01)

(58) Field of Classification Search
CPC ........... G08G 1/09623; G08G 1/09626; G08G 1/096716; G08G 1/096783; G08G 1/165; G08G 1/166; G08G 1/168; H04N 7/18
See application file for complete search history.

(56) References Cited

U.S. PATENT DOCUMENTS

| | | | | |
|---|---|---|---|---|
| 8,620,032 B2* | 12/2013 | Zeng | ................ | G08G 1/09623 340/907 |
| 2001/0017650 A1* | 8/2001 | Bober | ................... | H04N 19/17 348/158 |
| 2002/0106109 A1* | 8/2002 | Retterath | ......... | G08G 1/096758 382/104 |
| 2005/0125121 A1 | 6/2005 | Isaji et al. | | |
| 2005/0143887 A1* | 6/2005 | Kinoshita | .............. | G08G 1/166 701/45 |
| 2009/0303077 A1 | 12/2009 | Onome et al. | | |
| 2010/0045448 A1 | 2/2010 | Kakinami | | |
| 2012/0069188 A1 | 3/2012 | Ohno et al. | | |
| 2013/0010117 A1* | 1/2013 | Miyoshi | .................... | B60R 1/00 348/148 |
| 2014/0012464 A1* | 1/2014 | Hiei | ......................... | B60R 1/00 701/36 |
| 2014/0063197 A1* | 3/2014 | Yamamoto | ............ | G08G 1/166 348/46 |

FOREIGN PATENT DOCUMENTS

| | | |
|---|---|---|
| JP | 2007-183764 A | 7/2007 |
| JP | 2008-252327 A | 10/2008 |

OTHER PUBLICATIONS

Written Opinion of the International Searching Authority; PCT/JP2013/004559; dated Oct. 29, 2013; with concise explanation.

An Office Action; "Notification of the First Office Action," issued by the Chinese Patent Office dated Oct. 28, 2015, which corresponds to Chinese Patent Application No. 201380039580.9; with English language translation.

The extended European search report issued by the European Patent Office dated Mar. 16, 2016, which corresponds to European Patent Application No. 13822760.8-1803 and is related to U.S. Appl. No. 14/414,784.

* cited by examiner

IMAGE PROCESSING APPARATUS, IMAGING APPARATUS, MOVABLE OBJECT, PROGRAM, AND REGION SETTING METHOD

CROSS REFERENCE TO RELATED APPLICATION

This application claims priority to and the benefit of Japanese Patent Application No. 2012-167778 filed on Jul. 27, 2012, the entire contents of which are incorporated herein by reference.

TECHNICAL FIELD

The present invention relates to an image processing apparatus for setting a region of a peripheral image to be used, an imaging apparatus, a movable object, a program, an a region setting method.

BACKGROUND ART

There is known a vehicle periphery recognition system mounted on a vehicle for capturing an image around a vehicle by using an imaging apparatus and conducts a variety of analyses based on the captured image. Generally, a size and a direction of the image captured as an analysis subject are not fixed.

As such, there is suggested a method of extracting a partial image having a size and a position changed from those of an obtained peripheral image based on movable object information such as a travel speed, a steering angle, and a tilt angle of the vehicle (see Patent Document 1).

RELATED ART DOCUMENT

Patent Document

Patent Document 1: Japanese Patent Application Laid-Open Publication No. 2006-178652

SUMMARY OF INVENTION

Technical Problem

However, an image region to be recognized during actual driving of the vehicle may change according to the movable object information of the vehicle itself as well as other factors. However, the invention described in Patent Document 1 does not consider those other factors in determination on the image region.

Accordingly, an object of the present invention in view of the above problem is to provide an image processing apparatus for setting the image region to be used according to various conditions of the movable object such as the vehicle, an imaging apparatus, a movable object, a program, and a region setting method.

Solution to Problem

In order to solve the above problem, an image processing apparatus according to a first aspect of the present invention includes:

a road information receiver for obtaining road information around a movable object; and a region setter for setting, based on the road information, a region of a peripheral image of the movable object to extract.

Preferably, a second aspect of the present invention is the image processing apparatus, wherein the road information includes at least one of the presence of an intersection, a railway crossing, a pedestrian crossing, a school zone, a tunnel, a slope, a train station, a bus stop, a car parking, an interchange, a junction, and other mobile bodies moving in directions different from a direction of the movable object, and warning information.

Preferably, a third aspect of the present invention is the image processing apparatus further including a movable object information receiver for obtaining movable object information including at least one of a travel speed, a steering angle, brake control, a lighting direction, and a direction indicator of the movable object, wherein the region setter sets the region based on the movable object information.

Preferably, a fourth aspect of the present invention is the image processing apparatus, wherein the number of pixels of an image obtained by the image receiver is greater than the number of pixels of an image output from the image processing apparatus.

Preferably, a fifth aspect of the present invention is the image processing apparatus, wherein the road information receiver obtains the road information by obtaining a current location and retrieving road information about a road corresponding to the current location.

Preferably, a sixth aspect of the present invention is the image processing apparatus further including an image receiver for obtaining the peripheral image of the movable object, wherein the road information receiver obtains the road information by conducting an image analysis of the peripheral image.

Preferably, a seventh aspect of the present invention is an imaging apparatus including:

an image processing apparatus including an image receiver for obtaining a peripheral image of a movable object, a road information receiver for obtaining road information around the movable object, and a region setter for setting, based on the road information, a region of the peripheral image to extract; and an imaging unit mounted on the movable object for outputting, to the image receiver, the peripheral image obtained by capturing an image around the movable object.

Preferably, an eighth aspect of the present invention is an imaging apparatus including:

an imaging unit for capturing a peripheral image of a movable object;

a road information receiver for obtaining road information around a current location of the movable object; and a region setter for setting, based on the road information, a region of the imaging unit for capturing the peripheral image.

Preferably, a ninth aspect of the present invention is a movable object including:

an image processing apparatus including an image receiver for obtaining a peripheral image of a movable object, a road information receiver for obtaining road information around the movable object, and a region setter for setting, based on the road information, a region of the peripheral image to extract; and an imaging apparatus including an imaging unit mounted on the movable object for outputting, to the image receiver, the peripheral image obtained by capturing an image around the movable object.

Although the apparatus has been described above as the solution according to the present invention, a method, a program, and a storage medium storing the program that are substantially corresponding to the apparatus may also implement the present invention and thus are included in the scope of the present invention.

For example, a program according to a tenth aspect of the present invention controlling an image processing apparatus to serve as:

an image receiver for obtaining a peripheral image of a movable object;

a road information receiver for obtaining road information around the movable object; and a region setter for setting, based on the road information, a region of the peripheral image to extract.

Also, a region setting method according to an eleventh aspect of the present invention includes:

an image obtainment step of obtaining a peripheral image of a movable object;

a road information reception step of obtaining road information around the movable object; and a region setting step of setting, based on the road information, a region of the peripheral image to extract.

Effect of the Invention

According to the image processing apparatus, the imaging apparatus, the movable object, the program, and the region setting method of the present invention as described above, a region of an image to use may be determined based on various conditions of the movable object such as a vehicle.

DESCRIPTION OF EMBODIMENT

Hereinafter, an embodiment of the present invention will be described with reference to the accompanying drawings.

Figure 1:
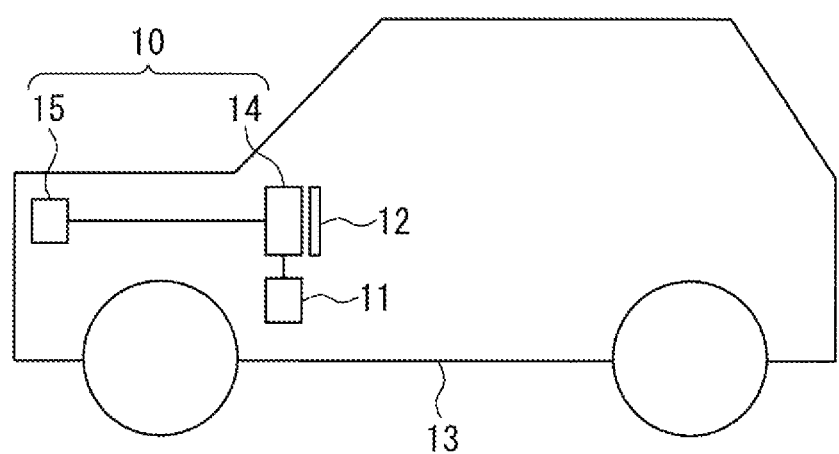
FIG. 1 is an arrangement diagram of an image processing apparatus inside a vehicle according to one embodiment of the present invention.

First, an imaging apparatus including an image processing apparatus according to one embodiment of the present invention will be described. FIG. 1 is an arrangement diagram of the imaging apparatus including the image processing apparatus inside a vehicle according to the present embodiment.

As illustrated in FIG. 1, an imaging apparatus 10, together with a GPS receiver 11 and a display 12, is provided inside a vehicle 13 serving as a movable object. An image processing apparatus 14 constituting the imaging apparatus 10 and the GPS receiver 11 may be located anywhere inside the vehicle and, according to the present embodiment, are located near a driver's seat. An imaging unit 15 also constituting the imaging apparatus 10 may be located anywhere on the vehicle 13 and, according to the present embodiment, in order to capture a peripheral image in front of the vehicle, is fixed to a front portion of the vehicle 13. The display 12 is provided to be visible from the driver's seat.

The imaging apparatus 10 includes the image processing apparatus 14 and the imaging unit 15. As described later, the imaging unit 15 captures the peripheral image of the vehicle. As described later, also, the image processing apparatus 14 carries out image processing on the peripheral image captured by the imaging unit 15. The image processing apparatus 14 outputs the peripheral image subjected to the image processing to the display 12.

The GPS receiver 11 receives signals from three or more GPS satellites and, by measuring a distance between the vehicle 13 and the GPS satellites and a change rate of the distance relative to the satellites, measures a current location, a travel speed, and a travel direction of the vehicle 13.

The display 12 is, for example, an LCD for displaying the image output from the imaging apparatus 10. The display 12 displays the image in 0.3 million pixels, i.e., in VGA size.

Figure 2:
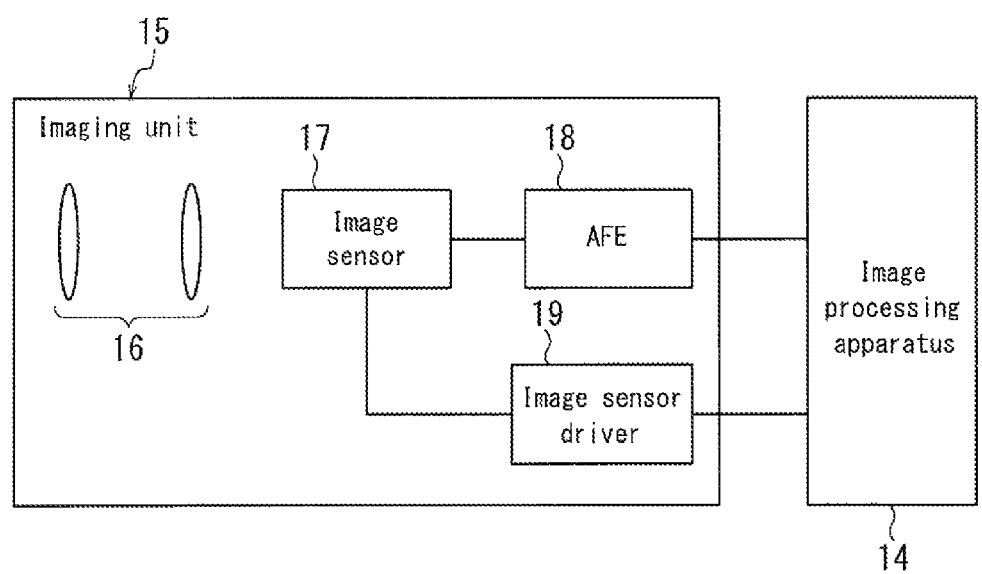
FIG. 2 is a functional block diagram illustrating a schematic configuration of an imaging unit in FIG. 1.

Next, a configuration of the imaging unit 15 will be described. As illustrated in FIG. 2, the imaging unit 15 includes an optical system 16, an image sensor 17, an AFE (Analog Front End) 18, and an image sensor driver 19.

The optical system 16 includes a plurality of lenses fixed in such a manner to allow for incidence of an optical image in front of the vehicle. The optical system 16 forms an incident optical image on a light-receiving surface of the image sensor 17. The optical system 16 has a deep depth of field and a wide viewing angle.

The image sensor 17 is, for example, a CCD image sensor or a CMOS image sensor and generates an image signal corresponding to the peripheral image formed on the light-receiving surface. The image sensor 17 includes 1.3 million pixels, which is more than the pixels of the display 12. Therefore, a resolution of the peripheral image being captured is greater than that of the image displayed on the display 12.

The AFE 18 carries out CDS/SH processing, AGC processing, and AD conversion processing on the peripheral image obtained from the image sensor 17. The AFE 18 outputs the peripheral image subjected to the AD conversion processing to the image processing apparatus 14.

The image sensor driver 19 drives the image sensor 17 to capture an image and generate the image signal. The image sensor driver 19, based on an execution instruction to capture an image obtained from the image processing apparatus 14, drives the image sensor 17.

Figure 3:
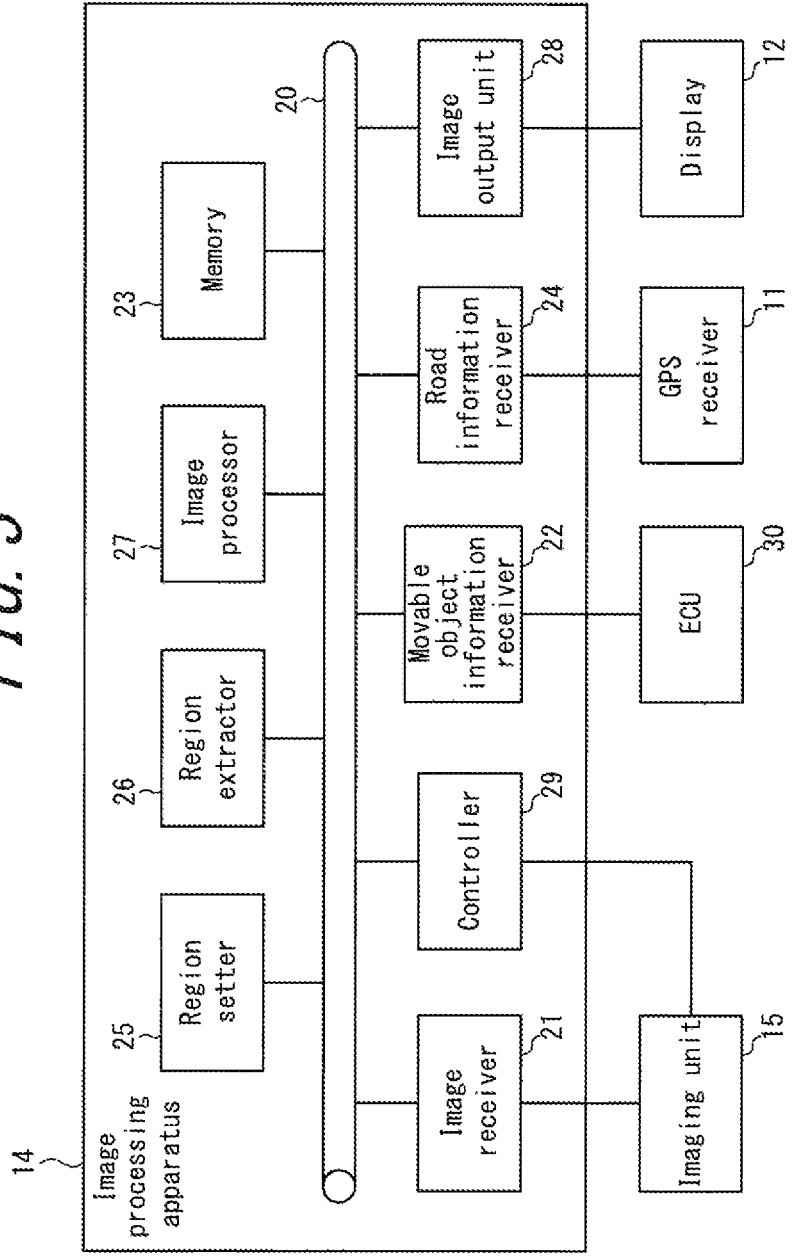
FIG. 3 is a functional block diagram illustrating a schematic configuration of the image processing apparatus in FIG. 1.

Next, a configuration of the image processing apparatus 14 will be described. As illustrated in FIG. 3, the image processing apparatus 14 includes a bus 20, an image receiver 21, a movable object information receiver 22, a memory 23, a road information receiver 24, a region setter 25, a region extractor 26, an image processor 27, an image output unit 28, and a controller 29.

The bus 20 connects the image receiver 21, the movable object information receiver 22, the memory 23, the road information receiver 24, the region setter 25, the region extractor 26, the image processor 27, the image output unit 28, and the controller 29 to one another for transmission of data and instructions.

The image receiver 21 obtains the peripheral image as image data from the imaging unit 15.

The movable object information receiver 22, from an ECU (Electronic Control Unit) 30, obtains movable object information including at least one of the travel speed, a steering angle, brake control, lighting direction at the time of lighting, and the lighting of a direction indicator of the vehicle.

The memory 23 stores information necessary for the image processor 27 to execute various functions. For example, the memory 23 stores a road corresponding to the current location measured by the GPS receiver 11 and road information of each road. The road information includes at least one of an intersection, a railway crossing, a pedestrian crossing, a school zone, a tunnel, a slope, a train station, a bus stop, a car parking, an interchange, and a junction.

The road information receiver 24 obtains, from the GPS receiver 11, the current location of the vehicle 13 as location information. The road information receiver 24 retrieves, from the memory 23, road information about the road corresponding to the current location obtained from the GPS receiver 11.

The region setter 25, based on the current location obtained by the road information receiver 24, the road information retrieved from the memory 23 by the road information receiver 24, and the movable object information obtained by the movable object information receiver 22, determines a region of the peripheral image obtained by the image receiver 21 to extract. In particular, the region setter 25 sets the region to extract as described below.

The region setter 25 calculates a distance from the current location to a nearest object in the road information. The region setter 25, when the distance is at a distance threshold or shorter, sets an entire peripheral image as the region to extract. The region setter 25, when the distance is longer than the distance threshold, based further on at least one of the travel speed and the brake control of the vehicle, sets the region to extract.

The region setter 25, at least one of when the travel speed of the vehicle is under a speed threshold and when the vehicle is under the brake control, sets the entire peripheral image as the region to extract. The region setter 25, when the travel speed of the vehicle is no less than the speed threshold and, simultaneously, the vehicle is not under the brake control, sets 23% (approximately 0.3 million/1.3 million) of the peripheral image to extract.

The region setter 25, when determining a size of the region to extract, determines a position of the region to extract based at least on any one of the steering angle, the lighting of the direction indicator, and the lighting direction obtained by the movable object information receiver 22.

For example, a combination of the steering angle and the lighting of the direction indicator allows for a determination on the travel direction of the vehicle among a forward direction, a right direction, and a left direction. The region setter 25, when the travel direction of the vehicle is the forward direction, sets the position of the region by placing a center of the region on a center of the peripheral image. The region setter 25, when the travel direction of the vehicle is the right direction, sets the position of the region by placing the center of the region on a position off-center to the right from the center of the peripheral image. When the travel direction of the vehicle is the left direction, a method similar to that employed when the travel direction is the right direction is employed.

Also, when the lighting direction is a long distance direction, that is, when a high beam is on, it is assumed that a region approximately center of the peripheral image should be focused. On the other hand, when the lighting direction is a short distance direction, that is, when a low beam is on, it is assumed that a region below the region of the high beam should be focused. Therefore, the region setter 25, when the high beam is on, sets the position of the region by placing the center of the region on the center of the peripheral image. Also, the region setter 25, when the low beam is on, sets the position of the region by placing the center of the region below the center of the peripheral image.

Figure 4:
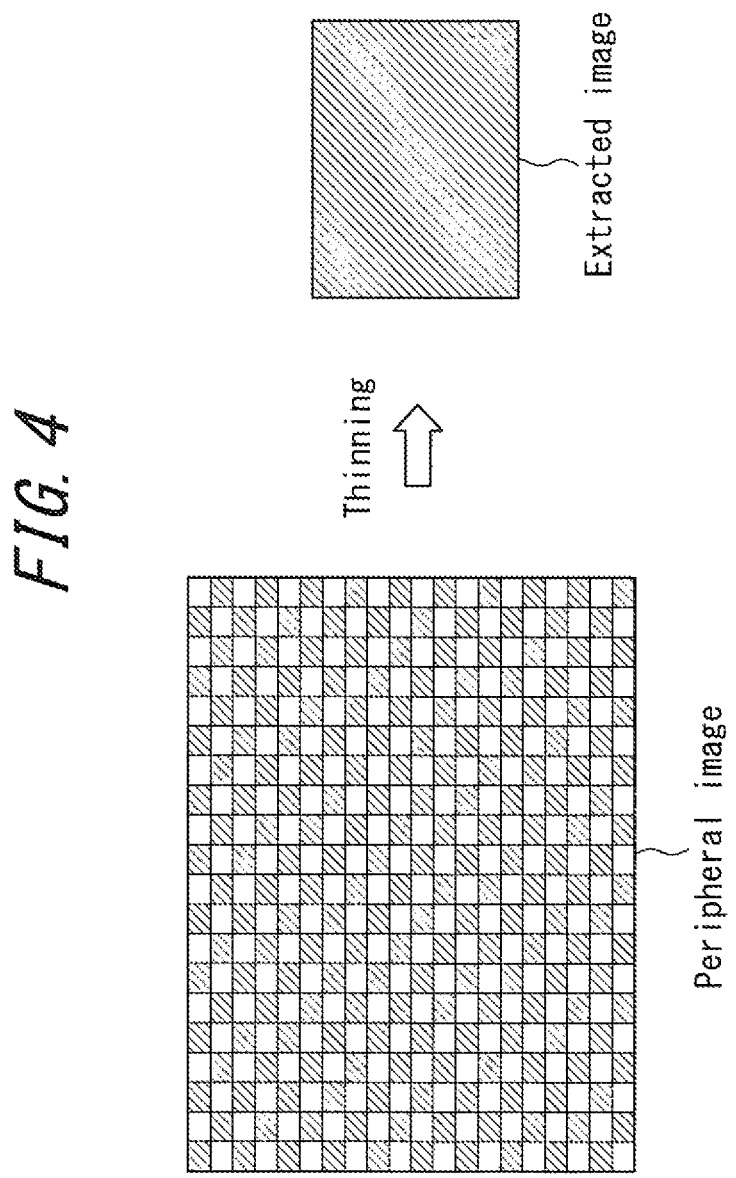
FIG. 4 is a conceptual diagram illustrating thinning and reading carried out when a region setter in FIG. 3 determines extraction of an entire peripheral image.
Figure 5:
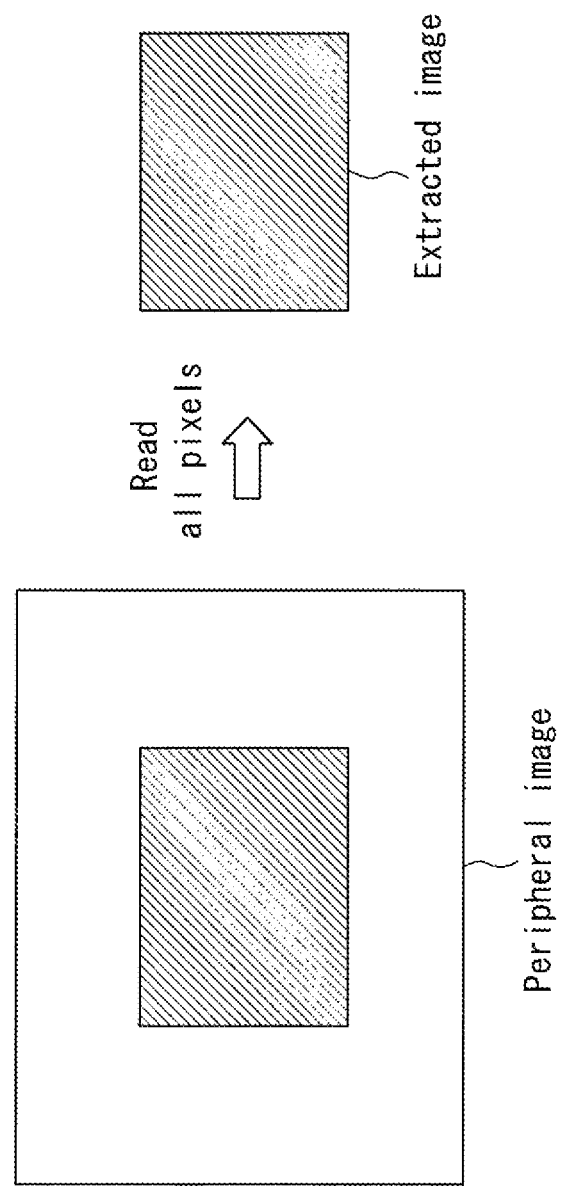
FIG. 5 is a conceptual diagram illustrating all-pixel reading carried out when the region setter in FIG. 3 determines extraction of a portion of the peripheral image.

The region extractor 26 extracts, from the peripheral image obtained by the image receiver 21, the region set by the region setter 25. The region extractor 26, when the region setter 25 sets the entire peripheral image as the region to extract, thins pixels constituting the peripheral image and adds pixels in the same color adjacent to one another, thereby extracting the region in which the number of pixels is reduced to 0.3 million (see FIG. 4). The region extractor 26, when the region setter 25 determines the region at 23% of the peripheral image to extract, extracts all pixels constituting the region determined by the region determination unit 25 as it stands (see FIG. 5).

The image processor 27 carries out predetermined image processing on the image extracted by the region extractor 26. The predetermined image processing includes, for example, color interpolation, white balance processing, contour enhancement processing, and gamma correction.

The image output unit 28 outputs image data subjected to the predetermine image processing by the image processor 27 to the display 12.

The controller 29 controls each unit constituting the image processing apparatus 14. Also, the controller 29 outputs an execution instruction to capture an image to the image sensor driver 19 of the imaging unit 15 (see FIG. 2).

Figure 6:
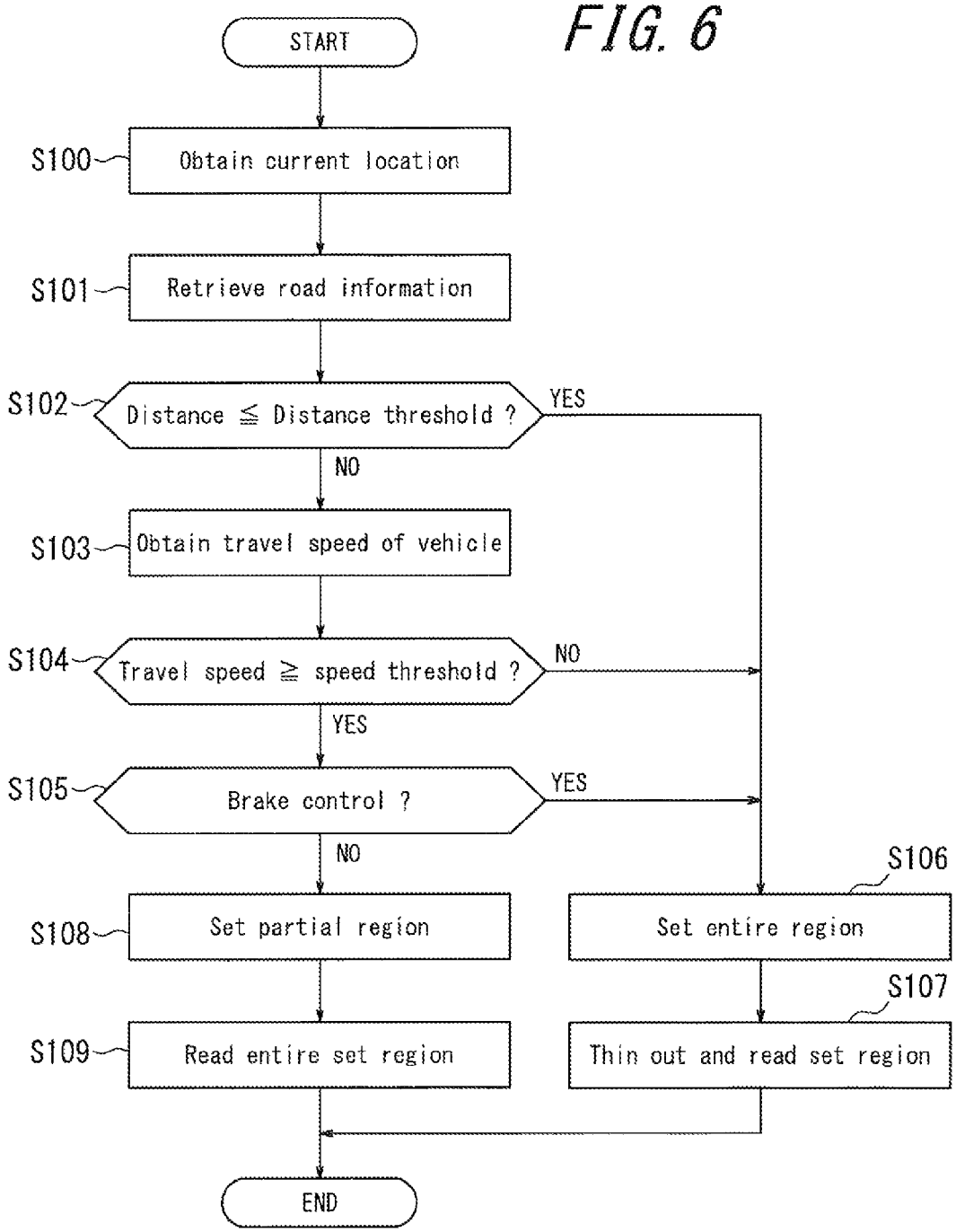
FIG. 6 is a flowchart illustrating a region extraction operation executed by a controller in FIG. 3.

Next, a region extraction operation executed by the controller 29 according to the present embodiment will be described with reference to a flowchart in FIG. 6. The controller 19 executes the region extraction operation every time the image receiver 21 obtains the peripheral image.

At step S100, the controller 29 controls the road information receiver 24 to obtain the current location. When the current location is obtained, a process of the operation proceeds to step S101.

At step S101, the controller 29 controls the road information receiver 24 to retrieve the road information corresponding to the current location from the memory 23. When the road information is retrieved, the process proceeds to step S102.

At step S102, the controller 29 controls the region setter 25 to calculate the distance from the current location to the nearest object in the road information. Also, the controller 29 controls the region setter 25 to determine whether the distance is at the distance threshold or shorter. When the distance exceeds the distance threshold, the process proceeds to step S103. When the distance is at the distance threshold or shorter, the process proceeds to step S106.

At step S103, the controller 29 controls the movable object information receiver 22 to obtain the travel speed of the vehicle from the ECU 30. When the travel speed is obtained, the process proceeds to step S104.

At step S104, the controller 29 controls the region setter 25 to determine whether the travel speed obtained at step S103 is at the speed threshold or higher. When the travel speed is at the speed threshold or higher, the process proceeds to step S105. When the travel speed is under the speed threshold, the process proceeds to step S106.

At step S105, the controller 29 controls the region setter 25 to determine whether the vehicle is under the brake control. When the vehicle is under the brake control, the process proceeds to step S106. When the vehicle is not under the brake control, the process proceeds to step S108.

At step S106, the controller 29 controls the region setter 25 to set the region to extract. The region setter 25 sets the entire peripheral image as the region to extract. When the region to extract is set, the process proceeds to step S107.

At step S107, the controller 29 controls the region extractor 26 to thin the pixels of the peripheral image so as to reduce a size of the image down to the VGA size. After thinning and reading the pixels, the region extraction operation ends.

At step S108, the controller 29 controls the region setter 25 to set the region to extract. The region setter 25 sets the region in size of 23% of the peripheral image as a size of the region to extract. Also, the region setter 25, based on at least any one of the steering angle, the lighting of the direction indicator, and the lighting direction, determines the position of the region to extract. When the size and the position of the region are determined and thus the region to extract is set, the process proceeds to step S109.

At step S109, the controller 29 controls the region extractor 26 to read all pixels from the region of the peripheral image set at step S108. When all pixels are read, the region extraction operation ends.

According to the image processing apparatus of the present embodiment as described above, since the region of the peripheral image to extract is set based on the road information, the region of the peripheral image to extract may be set based on various conditions of the movable object as well as the information on the movable object itself such as the travel speed and the like.

According to the present embodiment, also, the region to extract may be set based on the movable object information as well as the road information.

According to the present embodiment, also, since the resolution of the peripheral image being captured is greater than that of the image displayed, all pixels may be read when a portion of the peripheral image is extracted, while the pixels may be thinned or added when the peripheral image is extracted as it stands. Therefore, when a portion of the peripheral image is extracted, deterioration of the resolution in comparison with the resolution of the peripheral image extracted as it stands may be reduced.

According to the present embodiment, also, since the region to extract is set based on the peripheral image being obtained, the image processing apparatus may be used in combination with a generic imaging unit.

Although the present invention has been described based on the figures and the embodiment, it is to be understood that various modifications and changes may be implemented based on the present disclosure by those who are ordinarily skilled in the art. Accordingly, such modifications and changes are included in the scope of the present invention.

According to the present embodiment, for example, although the region setter 25 sets the region to extract from the peripheral image obtained by the image receiver 21, the region setter 25 may set a region of the light-receiving surface of the image sensor 17 to capture the peripheral image. In this case, when the entire light-receiving surface of the image sensor 17 is set as the region to capture the peripheral image, the controller 29 outputs an instruction to capture the peripheral image by thinning and reading the pixels to the image sensor driver 19. On the other hand, when a portion of the light-receiving surface of the image sensor 17 is set as the region to capture the peripheral image, the controller 29 outputs an instruction to capture the peripheral image by reading all pixels to the image sensor driver 19. Accordingly, the reading of pixels that are not used eventually is stopped, thereby reducing the time for reading the image.

According to the present embodiment, also, although the image processing apparatus 14 outputs the peripheral image to the display 12 such that the peripheral image is displayed on the display 12, the present invention is not restrictive thereto. The image according to the setting of the region may be used for other purposes such as for controlling the movable object and warning a driver based on analysis of the image according to the setting of the region.

According to the present embodiment, also, although the road information receiver 24 retrieves, from the memory 23, the road information about the road corresponding to the current location obtained from the GPS receiver 11, the road information may be obtained otherwise. For example, the road information receiver 24 may determine, by conducting an image analysis of the peripheral image obtained from the imaging unit 15, the presence of the road information (the intersection, the railway crossing, the pedestrian crossing, the school zone, the tunnel, the slope, the train station, the bus stop, the car parking, the interchange, and the junction) in the peripheral image. Also, the road information receiver 24 may obtain warning information such as a high accident spot from VICS (registered trademark) via a navigation device. Further, the road information receiver 24, via a road-to-vehicle communication, may obtain the presence of movable objects moving in directions different from that of the movable object itself (the vehicle 13) as the road information.

Figure 7:
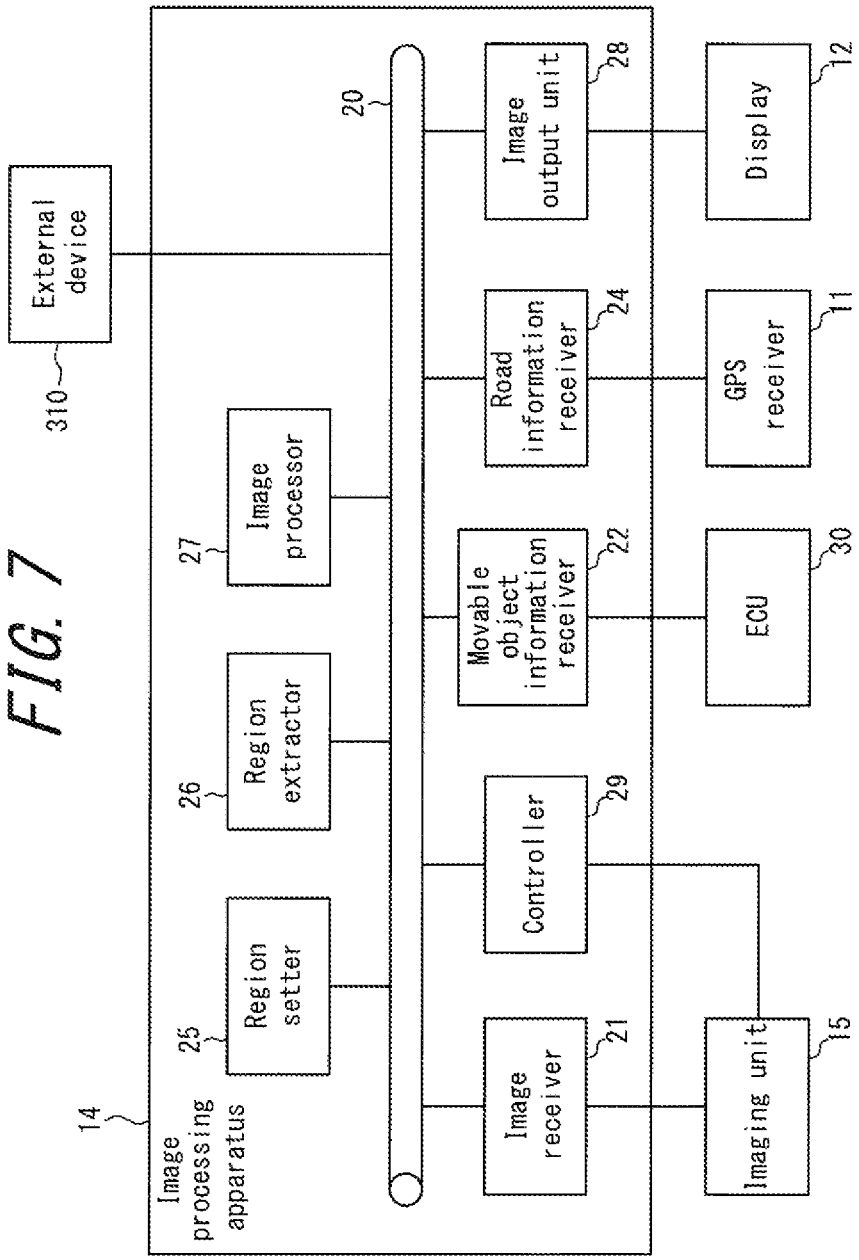
FIG. 7 is a functional block diagram illustrating a schematic configuration of a first exemplary variation of the image processing apparatus.

According to the present embodiment, also, although the road information receiver 24 retrieves the road information from the memory 23 of the image processing apparatus 14, the road information receiver 24 may retrieve the road information from an external device 310 such as the navigation device (see FIG. 7). In order to store information on numerous roads in association with the roads, the memory 23 is required to have a large capacity. However, when the road information is retrieved from the external device 310 such as the navigation device storing the road information, there is no need for the memory 23 to have a large capacity.

Figure 8:
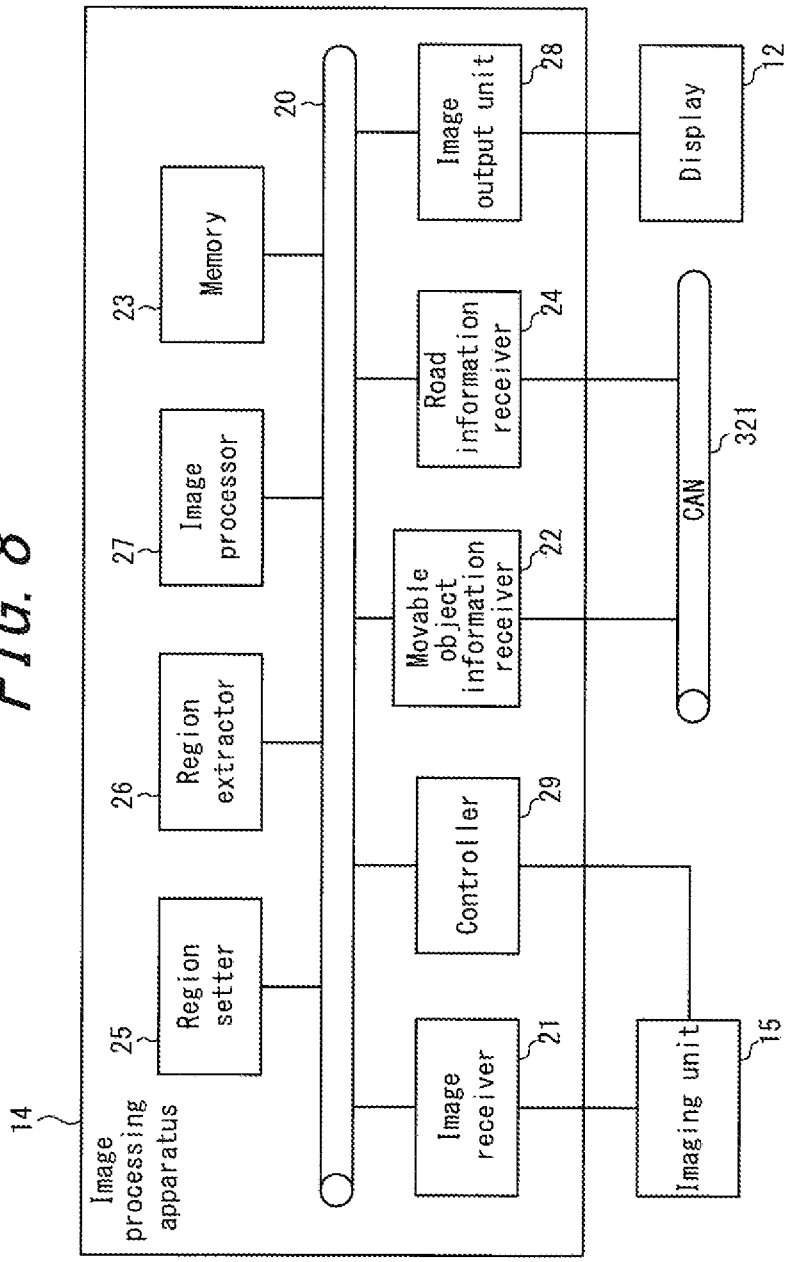
FIG. 8 is a functional block diagram illustrating a schematic configuration of a second exemplary variation of the image processing apparatus.

According to the present embodiment, also, although the image processing apparatus 14 is included in the imaging apparatus 10, the present invention is not restrictive thereto. As illustrated in FIG. 8, for example, the image processing apparatus 14 may be an apparatus such as the navigation device connected to CAN 321 (Controller Area Network) and mounted on the vehicle 13.

Figure 9:
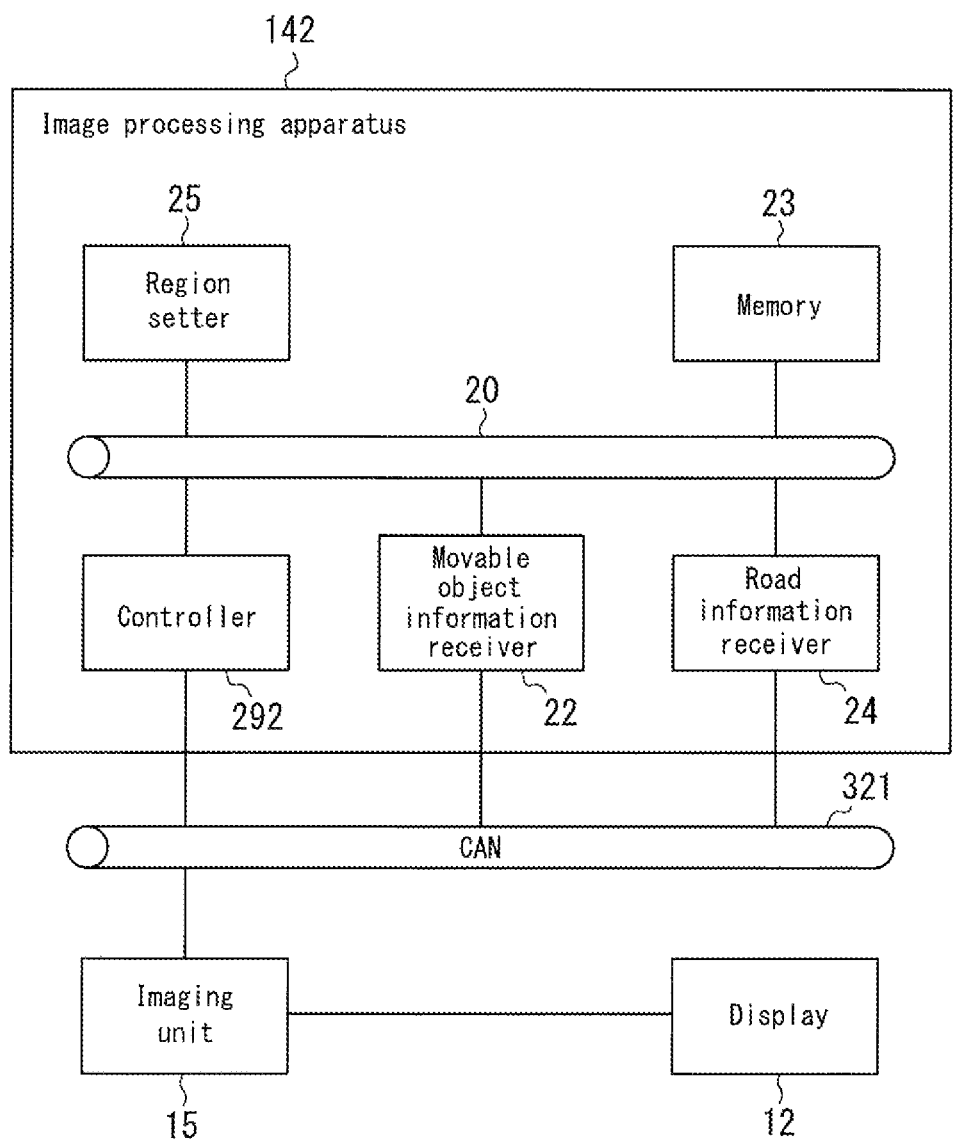
FIG. 9 is a functional block diagram illustrating a schematic configuration of a third exemplary variation of the image processing apparatus.

According to the present embodiment, further, although the image processing apparatus 14 obtains the peripheral image from the imaging unit 15 and outputs a region of the peripheral image extracted based on the road information and the like to the display 12, the image processing apparatus 14 may simply set the region to extract based on the road information and the like and externally output. As illustrated in FIG. 9, for example, an image processing apparatus 142 implementing the navigation device may include the bus 20, the movable object information receiver 22, the memory 23, the road information receiver 24, the region setter 25, and a controller 292 and set the region to extract without obtaining the peripheral image, and then the controller 292 notifies the imaging unit 15 of the region to extract via the CAN 321. In such a configuration, when the imaging unit 15 extracts the region according to the notification and outputs the region to the display 12, an image in an optimum region may be presented to the driver.

REFERENCE SIGNS LIST 10 imaging apparatus
11 GPS receiver
12 display
13 vehicle
14, 142 image processing apparatus
15 imaging unit
16 optical system
17 image sensor
18 AFE (Analog Front End)
19 image sensor driver
20 bus
21 image receiver
22 movable object information receiver
23 memory
24 road information receiver
25 region setter
26 region extractor
27 image processor
28 image output unit
29, 292 controller
30 ECU (Electronic Control Unit)
310 external device
321 CAN (Controller Area Network)

The invention claimed is:

1. An image processing apparatus comprising:
 a road information receiver configured to obtain road information around a movable object;
 a movable object information receiver configured to obtain movable object information including a travel speed or brake control of the movable object;
 a processor configured to:
  set, based on a distance from a current location of the movable object to a nearest object in the road information and at least one of the travel speed and the brake control of the movable object, a region of a peripheral image of the movable object to extract, and
  extract the region of the peripheral image to thereby create an extracted image, the extracted image having fewer pixels than the peripheral image; and
 an output unit configured to output only the extracted image.

2. The image processing apparatus according to claim 1, wherein
 the road information includes at least one of the presence of an intersection, a railway crossing, a pedestrian crossing, a school zone, a tunnel, a slope, a train station, a bus stop, a car parking, an interchange, a junction, and other movable objects moving in directions different from a direction of the movable object, and warning information.

3. The image processing apparatus according to claim 1, wherein
 the movable object information further includes at least one of a steering angle, a lighting direction, and a direction indicator of the movable object, and the processor is configured to set the region based on the movable object information.

4. The image processing apparatus according to claim 1, wherein
 the road information receiver obtains the road information by obtaining a current location and retrieving road information about a road corresponding to the current location.

5. The image processing apparatus according to claim 1, further comprising an image receiver configured to obtain the peripheral image of the movable object.

6. An imaging apparatus comprising:
 the image processing apparatus according to claim 1; and
 an imaging unit mounted on the movable object configured to output, to the image receiver, the peripheral image obtained by capturing an image around the movable object.

7. An imaging apparatus comprising:
 an imaging unit configured to capture a peripheral image of a movable object;
 a movable object information receiver configured to obtain movable object information including a travel speed or brake control of the movable object;
 a road information receiver configured to obtain road information around a current location of the movable object;
 a processor configured to:
  set, based on a distance from a current location of the movable object to a nearest object in the road information and at least one of the travel speed and the brake control of the movable object, a region of the peripheral image of the movable object to extract, and
  extract the region of the peripheral image to thereby create an extracted image, the extracted image having fewer pixels than the peripheral image; and
 an output unit configured to output only the extracted image.

8. A movable object comprising the imaging apparatus according to claim 6.

9. A non-transitory computer-readable medium storing a program for controlling an image processing apparatus to serve as:
 a road information receiver configured to obtain road information around a movable object;
 a movable object information receiver configured to obtain movable object information including a travel speed or brake control of the movable object;
 a processor configured to:
  set, based on a distance from a current location of the movable object to a nearest object in the road information and at least one of the travel speed and the brake control of the movable object, a region of a peripheral image of the movable object to extract, and
  extract the region of the peripheral image to thereby create an extracted image, the extracted image having fewer pixels than the peripheral image; and
 an output unit configured to output only the extracted image.

10. A region setting method comprising:
 obtaining road information around a movable object;
 obtaining movable object information including a travel speed or brake control of the movable object;
 setting, based on a distance from a current location of the movable object to a nearest object in the road information and at least one of the travel speed and the brake control of the movable object, a region of a peripheral image of the movable object to extract;

extracting the region of the peripheral image to thereby create an extracted image, the extracted image having fewer pixels than the peripheral image; and outputting image data corresponding to only the extracted image.

11. The image processing apparatus according to claim 5, wherein the road information receiver obtains the road information by conducting an image analysis of the peripheral image.

12. The image processing apparatus according to claim 1, wherein the processor is further configured to calculate a distance between the movable object and at least one object in the road information, wherein, in setting the region of the peripheral image of the movable object, a size of the region relative to the peripheral image is based at least in part on the distance between the movable object and the at least one object in the road information.

13. The image processing apparatus according to claim 7, wherein the processor is further configured to calculate a distance between the movable object and at least one object in the road information, wherein, in setting the region of the peripheral image of the movable object, a size of the region relative to the peripheral image is based at least in part on the distance between the movable object and the at least one object in the road information.

14. The non-transitory computer-readable medium according to claim 9, wherein the processor is further configured to calculate a distance between the movable object and at least one object in the road information, wherein, in setting the region of the peripheral image of the movable object, a size of the region relative to the peripheral image is based at least in part on the distance between the movable object and the at least one object in the road information.

15. The region setting method according to claim 10, further comprising:

calculating a distance between the movable object and at least one object in the road information, wherein, in setting the region of the peripheral image of the movable object, a size of the region relative to the peripheral image is based at least in part on the distance between the movable object and the at least one object in the road information.

\* \* \* \* \*